United States Patent Office 3,006,859
Patented Oct. 31, 1961

3,006,859
PROCESSING OF RADIOACTIVE WASTE
Rudolph T. Allemann, Richland, and Benjamin M. Johnson, Jr., Kennewick, Wash., assignors to the United States of America as represented by the United States Atomic Energy Commission
No Drawing. Filed Aug. 23, 1960, Ser. No. 51,471
6 Claims. (Cl. 252—301.1)

This invention deals with a process of concentrating radioactive waste solutions as a preparation for their disposal into the ground or to the bottom of the ocean or of any other body of water.

Waste solutions of the kind that are to be treated by the process of this invention are obtained in the recovery of uranium and/or plutonium from neutron-irradiated fuel materials or fuel elements by solvent extraction, by precipitation or by adsorption processes. Such waste solutions contain the fission products in a very dilute form, but they mostly contain salts in comparatively high concentrations; for instance, aluminum nitrate necessary for salting-out purposes, reducing or oxidizing agents necessary for conversion of the actinides from one oxidation state to another, and decomposition products formed during reaction from these reducing and oxidizing agents are often present in macroconcentrations.

These waste solutions are not suitable for immediate disposal because they are by far too voluminous and also because the fission products are present in a water-soluble form which would cause contamination of the entire surroundings by diffusion or the like.

It has been suggested heretofore to admix phosphates, silicates and/or borates to the waste solutions and then to spray-evaporate the solutions into a calciner the walls of which are heated so that the spray contacting them is dried, calcined and finally melted. The particles, after solidification, are then separated from the vapor and gaseous products.

The waste solutions as discharged from the chemical processing plants are generally fairly concentrated and highly acidic. Present storage practice involves neutralization with a 50 percent by weight aqeuous solution of sodium hydroxide and containment in steel tanks. However, lately these waste solutions have also been often subjected to a calcination step prior to disposal without storage, optionally after neutralization in order to reduce the volatility of the highly radioactive ruthenium. All these solutions have a relatively high salt content; the neutralized waste solutions or rather slurries (some metals, such as iron, aluminum, chromium and nickel, precipitate as hydroxides during neutralization) generally contain sodium nitrate in a concentration of about 6 N, and both neutralized and acidic wastes frequently contain high concentrations of sulfates.

The presence of salts in these high concentrations has a number of drawbacks. For instance, sodium nitrate melts at a comparatively low temperature (at about 300° C.), and molten sodium nitrate tends to coat the walls of the equipment which causes shut-down of the operation. It is also unsafe to store the slurry in an unvented container, because radiolysis and thermal decomposition occur and the heat created by radioactive decay may cause melting of the sodium nitrate which in turn may cause melting of the container or else necessitate the use of nonreactive materials for the vessels. Also, high contents of sulfates other than alkali or alkaline earth sulfates are undesirable on account of their relative instability.

It is an object of this invention to provide a process of concentrating aqueous radioactive waste solutions and slurries by which the content of nitrates and unstable sulfates is reduced to a negligible amount.

It has been found that by adding sugar to waste slurries, either neutralized or acidic, all of the above-listed drawbacks can be overcome. The sugar, when heated together with the slurry, does not react during dehydration temperature; however, when it reaches a temperature of about 220° C., the mixture of sugar plus nitrate and/or unstable sulfate ignites, the sugar is decomposed and the carbon formed from the sugar reduces and decomposes the nitrate or unstable sulfates. A powder is obtained that has a comparatively high density (about 0.9) and is free-flowing.

This powder then is further heated to a temperature of from 800 to 900° C. whereby it melts and forms a compact mass of a density of from 2.5 to 3 gm./cc. This mass is stable against thermal decomposition or radiolysis.

Other carbon-containing materials can be used instead of sugar. For instance, graphite, lampblack and activated charcoal have been found operative; however, sugar gave the best results. Sugar is added in a quantity to yield a concentration of from 150 to 300 grams per liter, a concentration of about 250 grams per liter being preferred.

Air is suitable as the spraying means; however, steam is preferred, because it can be condensed and the volume of off-gas can thus be limited; also, due to the lesser volume of off-gas, less particle entrainment occurs, which is important in the case of radioactive materials. Oxygen should be introduced; however, its amount should not be greater than is required to oxidize, to carbon dioxide, the sugar not necessary for reaction with the salts, because then a sugar-salt reaction has to take place rather than a sugar-oxygen reaction.

The spray calciner described in copending application Serial No. 862,732, filed by Benjamin M. Johnson, Jr. and Gerald B. Barton on December 29, 1959, is suitable for carrying out the process of this invention. The spraying nozzle, however, advantageously has a so-called clean-out needle when used for this method, because the precipitate of the slurry tends to clog the nozzle; this would make periodic discontinuation for cleaning necessary. The powder obtained by calcination can either be melted within the calciner by heating the calciner walls to melting temperature, about 800 to 900° C., or else a melt chamber may be arranged below the spray calciner for this purpose. The latter is preferred. This melt chamber is preferably lined with a ceramic material. The powder formed in the calciner will then drop directly into the chamber which is heated to melting temperature.

In the following, two examples are given for illustrative purposes only.

*Example I*

An aqueous waste slurry was used having a composition similar to that of the slurries usually obtained after solvent extraction of dissolver solutions of neutron-reacted uranium and neutralization of free acid with sodium hydroxide. This slurry contained sodium nitrate (in the supernatant) in a concentration of 7.15 M, sodium sulfate (also in the supernatant) in a concentration of 0.5 M, ferric hydroxide 0.2 mole per liter of slurry, aluminum hydroxide 0.1 mole per liter of slurry, nickelous 0.006 mole per liter and chromic hydroxide in a concentration of 0.010 mole per liter of slurry.

Two parallel experiments were carried out; one of the experiments was run with the solution as was, while for the other one sugar was added in a quantity to yield a concentration of about 250 grams per liter. Each solution was evaporated and heated to calcination temperature in the spray-calciner having a melting chamber as described above. The calciner had a diameter of 8 inches and a height of 10 feet. The walls of the calciner had a temperature of 600° C. at the top and of 800° C.

in the hottest, center, section. Steam was introduced at a flow rate of approximately 8 pounds per hour, and the slurry had a flow rate of 1 gallon per hour.

The run made with the slurry to which no sugar had been added had to be terminated after a very short period, as molten sodium nitrate had coated the walls of the reactor and plugged the filter used to separate the solid powder from the off-gases. Operation of the unit with this feed was not possible.

Operation of the unit with sugar proceeded without incident. The product that dropped into the melting chamber from the calciner had a bulk density of 0.85 gm./cc. and was primarily composed of thermally stable $Na_2CO_3$. The melted products had a density of 2.25.

*Example II*

An acidic solution of simulated radioactive waste solution was calcined both with and without the addition of sugar (200 gm./l.). This solution contained free acid in a concentration of 1.0 M, sodium ion 1.0 M, ferric ion 0.76 M, aluminum ion 0.1 M, chromic ion 0.04 M, nickelous ion 0.02 M, nitrate ion 1.35 M, and sulfate ion 1.7 M. Like in Example I, fission products were not added because of their low concentration and negligible effect.

Operating temperatures of the reactor were 600° C. at the top and 840° C. in the center. Steam was introduced at the rate of about 15 pounds per hour and the feed solution at a rate of 3 gallons per hour. During the run in which sugar was added to the feed, oxygen was introduced at the rate of about 0.5 gram mole per minute which is approximately 40 percent of the stoichiometric rate for complete combustion of the carbon formed of the sugar.

The effect of sugar on the reduction of unstable sulfates is evident from the analysis of the product. The product from the run made without the sugar contained 59 weight percent of sulfate and lost 28 percent of its weight on prolonged heating at 900° C. That resulting from the run with sugar contained 33 weight percent of sulfate and lost 0.5 percent of its weight on prolonged heating at 900° C. Both products formed dense compact solids with a density of 2.35 upon heating to 900° C.

It will be understood that this invention is not to be limited to the details given herein but that it may be modified within the scope of the appended claims.

What is claimed is:

1. A process of concentrating a radioactive fission-product- and salt-containing waste solution derived from the chemical processing of neutron-irradiated uranium fuel elements prior to disposal, comprising adding sugar to said solution; spraying said solution into a heated space whereby water evaporates and a powder is formed; heating said powder to at least 220° C. in the presence of oxygen whereby ignition takes place, the sugar is decomposed to carbon and the salts are decomposed by said carbon; heating the powder to a temperature of between 800 and 900° C. whereby it melts; and cooling the melt whereby a compact mass of high density is obtained.

2. The process of claim 1 wherein spraying is carried out by mixing the waste solution with steam.

3. The process of claim 1 wherein sugar is added in a quantity to yield a concentration of between 150 and 300 grams per liter.

4. The process of claim 3 wherein the sugar concentration is about 250 grams per liter.

5. The process of claim 1 wherein the oxygen amount during dehydration and decomposition of the sugar-containing solution is restricted to about that necessary for the conversion, to carbon dioxide, of that amount of sugar that is not necessary for reaction with the salt.

6. A process of concentrating a radioactive fission-products-containing mineral acid waste solution derived from the chemical processing of neutron-irradiated uranium fuel elements prior to disposal, comprising neutralizing all free mineral acid in said solution with alkali metal hydroxide whereby the solution is converted to a slurry and mineral acid salts of said alkali metal are formed; adding sugar to said slurry; spraying said slurry into a heated space whereby water evaporates and a powder is formed; heating said powder to at least 220° C. in the presence of oxygen whereby ignition takes place, the sugar is decomposed to carbon and the mineral acid salts are decomposed by said carbon; heating the powder to a temperature of between 800 and 900° C. whereby it melts; and cooling the melt whereby a compact mass of high density is obtained.

References Cited in the file of this patent

Proceedings of 2nd Geneva Conference on the Peaceful Uses on Atomic Energy, vol. 18, 1958, Goldman et al., pp. 27–32, Loeding, pp. 56–67, United Nations, N.Y.

Bruce et al.: "Process Chemistry," vol. 2, 1958, pp. 424–427.